Patented Apr. 9, 1940

2,196,239

UNITED STATES PATENT OFFICE 2,196,239

PRODUCTION OF DIACETYL IN BUTTER CULTURES

Chester Hamlin Werkman and Bernard Wernick Hammer, Ames, Iowa, assignors to Iowa State College Research Foundation, Ames, Iowa, a corporation of Iowa No Drawing. Application August 2, 1937, Serial No. 157,064

7 Claims. (Cl. 195—30)

This invention relates to diacetyl production in butter cultures and the like.

An object of the invention is to improve the flavor and aroma of butter by increasing its diacetyl content. A further object is to provide a method for ripening butter cultures and pure cultures of citric acid fermenting streptococci under conditions which will increase the diacetyl content of the cultures. Other specific objects and advantages will appear as the specification proceeds.

In a butter culture, the diacetyl is formed through the fermentation of citric acid. A portion of the citric acid broken down is apparently changed to acetylmethylcarbinol, and some of this is then oxidized to diacetyl. The production of acetylmethylcarbinol and diacetyl in a butter culture can be conspicuously increased by adding citric acid to the milk used in making the culture.

Analyses show that ordinarily only a relatively small percentage of the carbinol in a butter culture is changed to diacetyl. Some of it remains unchanged for a time and some is reduced to 2,3-butyleneglycol through the action of the organisms that produced the carbinol. Since neither acetylmethylcarbinol nor 2,3-butyleneglycol is of value from the flavor standpoint, the oxidation of the carbinol to diacetyl is a desirable transformation.

The oxidation of acetylmethylcarbinol to diacetyl is not a direct chemical change but requires the action of the citric acid fermenting streptococci normally present in butter cultures, (Streptococcus citrovorus and Streptococcus paracitrovorus). We have found that by maintaining the cultures under pressure during the ripening period and during this period stirring or bubbling air through the cultures, the bacterial oxidation is greatly increased so as to substantially increase the content of diacetyl in the butter cultures.

The use of air pressure alone does not seem to be sufficient. Unless the medium is agitated, the air under pressure is apparently unable to penetrate deeply enough to be effective. The important steps are the maintenance of the medium under pressure during ripening while at the same time stirring mechanically or with air during the ripening period.

Specific examples may be given as follows:

Pure milk cultures of Streptococcus paracitrovorus and butter cultures were used.

The pure cultures were inoculated into sterile skim milk and allowed to grow over night. The acidity was then adjusted with either sterile citric acid or with sterile citric and sulfuric acids (in aqueous solution) to a pH between 3.8 and 4.0, depending on the optimal acidity for the organisms used. When citric was the sole acid, approximately 0.85 per cent of the acid was added. If both sulfuric and citric acids were used, 0.15 to 0.20 per cent citric was first added to the culture and then sufficient sulfuric acid added (usually about 0.3 per cent) to give the desired pH.

The butter cultures consisted of pasteurized skim milk to which, e. g., 2 per cent active butter culture had been added. In some cases, whole milk was used to prevent excessive foaming.

The cultures were ripened in sterilized pressure containers, the liquid body being agitated by either passing air through it or by using mechanical stirrers. The containers were kept in a water bath at approximately 21° C. The duration of the ripening period varied, but in most of the operations which are hereto referred to by way of illustration, the ripening periods extended for a period of about 17 hours.

At 15 pounds pressure, the increase in the diacetyl content was hardly noticeable, but at 30 pounds pressure, there was a very substantial increase in diacetyl production. Slight additional increases occurred at pressures higher than 30 pounds, but the additional diacetyl formed was not in proportion to the increased pressure. The greatest increase of diacetyl was when the pressure was maintained in the neighborhood of 30 pounds per square inch.

The yields of diacetyl in the mechanically stirred cultures usually exceeded those of the aerated cultures. A possible explanation of this fact lies in the volatility of diacetyl; aeration may remove appreciable quantities of volatile products.

The results of the operations showed an increase of several hundred per cent in diacetyl and demonstrated that the production of diacetyl in butter cultures and pure cultures of citric acid fermenting streptococci can be greatly increased by growing the cultures under pressures in the neighborhood of 30 pounds or more of air per square inch, provided the cultures are agitated by aeration or stirring. The results also indicated that the use of pressure resulted in an increase of acetylmethylcarbinol. It is not known whether the citric acid is more rapidly fermented under pressure or the normal dissimilation of the acid is changed by pressure, but the indications are that the latter is true.

The ripened cultures, prepared as described, were cooled and then added to pasteurized sweet cream. After appropriate holding, the mixtures were churned. The butter so produced was scored and then held at 0° C. for six weeks to detect possible changes in flavor. The butter so produced with the pressure-agitation culture had a distinctly higher flavor at the time of the scoring and no changes in flavor were detected after six weeks.

Butter churned with cultures produced under the pressure-agitation process uniformly possesses a higher flavor and aroma. Such high flavored cultures may benefit the dairy industry either by aiding in the production of high score premium priced butter or by reducing the amount of culture required to secure the same flavor as that imparted by normal cultures to the butter.

While in the foregoing illustrative operations, we have set forth certain specific conditions and steps, it will be understood that such conditions and steps may and will be varied considerably by those skilled in the art without departing from the spirit of the invention. The foregoing detailed description has been given for clearness of understanding only, and no unnecessary limitations should be understood therefrom.

We claim:

1. In a process of the character set forth for the production of diacetyl in butter cultures containing citric acid and citric acid fermenting streptococci of the class consisting of *Streptococci citrovorus* and *Streptococci paracitrovorus*, the steps of ripening such a culture under air pressure substantially above 15 pounds pressure, and agitating the same during said ripening period.

2. In a process of the character set forth for the production of diacetyl in butter cultures containing citric acid and *Streptococcus paracitrovorus*, the steps of agitating such a culture while maintaining it under air pressure substantially above 15 pounds pressure.

3. In a process of the character set forth for the production of diacetyl in butter cultures containing citric acid and citric acid fermenting streptococci of the class consisting of *Streptococci citrovorus* and *Streptococci paracitrovorus*, the steps of ripening such a culture under air pressure in the neighborhood of 30 pounds per square inch, and continuously agitating the same during said ripening period.

4. In a process of the character set forth for the production of diacetyl in butter cultures containing citric acid and citric acid fermenting streptococci of the class consisting of *Streptococci citrovorus* and *Streptococci paracitrovorus*, the steps of bubbling air through such a culture while maintaining the same under air pressure substantially above 15 pounds pressure.

5. In a process of the character set forth for the production of diacetyl in butter cultures containing citric acid and citric acid fermenting streptococci of the class consisting of *Streptococci citrovorus* and *Streptococci paracitrovorus*, the steps of bubbling air through such a culture while maintaining the same under air pressure not substantially below 30 pounds per square inch.

6. In a process of the character set forth for the production of diacetyl in butter cultures containing citric acid and citric acid fermenting streptococci of the class consisting of *Streptococci citrovorus* and *Streptococci paracitrovorus*, the steps of mechanically stirring such a culture while maintaining the same under air pressure substantially above 15 pounds.

7. In a process of the character set forth for the production of diacetyl in butter cultures containing citric acid and citric acid fermenting streptococci of the class consisting of *Streptococci citrovorus* and *Streptococci paracitrovorus*, the steps of mechanically stirring such a culture while maintaining the same under air pressure in the neighborhood of 30 pounds per square inch.

CHESTER HAMLIN WERKMAN.
BERNARD WERNICK HAMMER.